US008730161B2

(12) United States Patent
Miyashita (10) Patent No.: US 8,730,161 B2
(45) Date of Patent: May 20, 2014

(54) INFORMATION PROCESSING APPARATUS, INFORMATION PROCESSING METHOD, AND PROGRAM

(75) Inventor: Ken Miyashita, Tokyo (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 13/023,598

(22) Filed: Feb. 9, 2011

(65) Prior Publication Data

US 2011/0199299 A1    Aug. 18, 2011

(30) Foreign Application Priority Data

Feb. 17, 2010   (JP) ................. P2010-032662

(51) Int. Cl.
*G09G 5/08*   (2006.01)
(52) U.S. Cl.
USPC .......................................... 345/157; 345/173
(58) Field of Classification Search
USPC ................................. 345/156–167, 173–178;
178/18.01–18.08
See application file for complete search history.

(56) References Cited

U.S. PATENT DOCUMENTS

| 5,777,605 | A | * | 7/1998 | Yoshinobu et al. | 345/173 |
| 7,109,975 | B2 | * | 9/2006 | Fedorak et al. | 345/173 |
| 7,439,953 | B2 | * | 10/2008 | Kaneko | 345/157 |
| 2004/0021643 | A1 | * | 2/2004 | Hoshino et al. | 345/173 |
| 2005/0028112 | A1 | * | 2/2005 | Iijima | 715/856 |
| 2008/0297486 | A1 | * | 12/2008 | Kim et al. | 345/173 |
| 2009/0262086 | A1 | * | 10/2009 | Chen | 345/173 |

FOREIGN PATENT DOCUMENTS

JP    2001-117713    4/2001

* cited by examiner

*Primary Examiner* — Amare Mengistu
*Assistant Examiner* — Stacy Khoo
(74) *Attorney, Agent, or Firm* — Sherr & Jiang, PLLC

(57) ABSTRACT

There is provided an information processing apparatus including a reception section which receives contact position information indicating a contact position of an operating tool on a contact surface, a cursor position control section which decides pre-movement position information indicating a position on a display surface of a cursor before being moved based on the contact position information. The reception section further receives an operating tool-movement vector indicating a direction in which and a distance by which the operating tool moves on the contact surface from the contact position while being in contact with the contact surface. The cursor position control section calculates a cursor-movement vector based on the operating tool-movement vector, and decides post-movement position information indicating a position of the cursor after being moved on a basis of the pre-movement position information and in accordance with the cursor-movement vector.

14 Claims, 7 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In recent years, there have been many information processing systems each including an information input apparatus which accepts information input from a user and an information processing apparatus which executes processing in accordance with the information received by the information input apparatus. For example, the information processing apparatus causes a display surface provided to the information processing apparatus to display a screen (web page or the like) in which objects such as a text box, a button, and a link are pasted. In order to select a desired object from among the displayed objects, the user inputs information for selecting the desired object with respect to the information input apparatus. The information processing apparatus determines which object is selected by the user in accordance with the information for selecting the desired object which is received from the information input apparatus, for example. There are various technologies for the user to input information for selecting a desired object to the information input apparatus.

For example, in order for the user to select a desired object, there is technology in which, based on information transmitted from the information input apparatus provided with a touch pad, an information processing apparatus decides a position of a cursor and determines that the object which the cursor points to is the desired object. In this technology, there are two main techniques for determining the position of the cursor.

A first technique is a technique of providing a movement vector of an operating tool (hereinafter, also referred to as "operating tool-movement vector") by a user moving the operating tool such as a finger while keeping the operating tool in contact with a touch pad provided to an information input apparatus. In this technique, the information processing apparatus calculates a movement vector of a cursor on a display surface (hereinafter, also referred to as "cursor-movement vector") based on the operating tool-movement vector, and moves the cursor on the basis of the position of the cursor after the previous movement and in accordance with the calculated cursor-movement vector. The first technique is a technique of moving the cursor to a relative coordinate position of the operating tool on the touch pad.

According to the first technique, the user can change a coefficient (hereinafter, also referred to as "scaling coefficient"), which is used at the time of the information processing apparatus calculating the cursor-movement vector based on the operating tool-movement vector, depending on a ratio of the size of the touch pad to the size of the display surface, preferences of the user, and the like. Therefore, the user sets a large scaling coefficient in the case where the user wants to increase a movement amount of the cursor with respect to a movement amount of the operating tool, and sets a small scaling coefficient in the case where the user wants to decrease the movement amount of the cursor with respect to the movement amount of the operating tool. However, it is necessary that the user perform the operation of changing the scaling coefficient in each case, and hence, there is an issue in the first technique that the operation is burdensome.

A second technique is a technique of providing position information indicating a position of an operating tool (hereinafter, also referred to as "operating tool-position information") by a user causing the operating tool such as a finger to touch a touch pad provided to an information input apparatus. In this technique, the information processing apparatus calculates position information indicating a position of a cursor on a display surface (hereinafter, also referred to as "cursor-position information") based on the operating tool-position information. Since a position on the touch pad is associated with a position on the display surface at a ratio of 1:1, the information processing apparatus may calculate the cursor-position information based on the association and the operating tool-position information. The second technique is a technique of moving the cursor to an absolute coordinate position of the operating tool on the touch pad.

According to the second technique, the user can quickly specify on the touch pad a rough position of the cursor. However, since the size of the touch pad is generally smaller than the size of the display surface, there is an issue in the second technique that it is difficult for the user to specify a cursor position of a destination on the touch pad in the case where the user wants to minutely move the cursor, for example.

In order to solve the issue mentioned in the first technique and the issue mentioned in the second technique, there is disclosed technology that enables a user to switch between the first technique and the second technique (for example, see JP-A-2001-117713). That is, by using the technology, the user can switch between a mode for moving the cursor to a relative coordinate position of the operating tool on the touch pad and a mode for moving the cursor to an absolute coordinate position of the operating tool on the touch pad.

SUMMARY OF THE INVENTION

However, according to the technology disclosed in JP-A-2001-117713, it is necessary that the user perform switching between the mode for moving the cursor to a relative coordinate position of the operating tool on the touch pad and the mode for moving the cursor to an absolute coordinate position of the operating tool on the touch pad. There was an issue that, when the operation for the switching was burdensome, particularly in the case where it was necessary to continuously move the cursor, the specification of the cursor position by the user was delayed one after another.

In light of the foregoing, it is desirable to provide a novel and improved technology which enables the user to quickly perform specification of the cursor position and to perform minute specification of the cursor position.

According to an embodiment of the present invention, there is provided an information processing apparatus which includes a reception section which receives, from an information input apparatus which has accepted input of contact position information indicating a contact position of an operating tool on a contact surface, the contact position information, and a cursor position control section which decides pre-movement position information indicating a position on a display surface of a cursor before being moved based on the contact position information received by the reception section. The reception section further receives, from the information input apparatus which has accepted input of an operating tool-movement vector indicating a direction in which and a distance by which the operating tool moves on the contact surface from the contact position while being in contact with the contact surface, the operating tool-movement vector. The cursor position control section calculates a cursor-movement vector indicating a movement direction and a movement distance of the cursor on the display surface based on the operating tool-movement vector received by the reception section, and decides post-movement position information indicating a position of the cursor after being moved on a basis of the decided pre-movement position information and in accordance with the calculated cursor-movement vector.

The information processing apparatus may further include a storage section which stores a plurality of pieces of object position information indicating positions of a plurality of objects on the display surface, and also stores specification information which is information for specifying information corresponding to the pre-movement position information decided by the cursor position control section from among the plurality of pieces of object position information, an object selection section which selects new selection object position information indicating a position of an object to be newly selected from among the plurality of pieces of object position information, based on the post-movement position information decided by the cursor position control section and the plurality of pieces of object position information stored in the storage section, and a specification information updating section which updates the specification information stored in the storage section with the new selection object position information selected by the object selection section.

The information processing apparatus may further include a processing execution section. The reception section may further receive, from the information input apparatus which has further accepted input of a processing request indicating execution of processing, the processing request. When the processing request is received by the reception section, the processing execution section may execute processing corresponding to the specification information stored in the storage section.

The reception section may receive, from the information input apparatus which has determined that the input of the processing request is accepted by detecting that the contact of the operating tool with respect to the contact surface is released, the processing request.

The reception section may receive, from the information input apparatus which has determined that the input of the processing request is accepted by detecting that pressure applied by the operating tool against the contact surface exceeds a predetermined value by using a pressure sensor, the processing request.

The storage section may store refuge object position information indicating a position of a predetermined refuge object on the display surface as at least one of the plurality of pieces of object position information. In executing the processing corresponding to the specification information stored in the storage section, the processing execution section may not execute the processing when the specification information is set to the refuge object position information.

The reception section may receive, from the information input apparatus which has determined that the input of the processing request is accepted by detecting that a button is pressed, the processing request.

The information processing apparatus may further include a transmission section which transmits information to the information input apparatus. Before updating the specification information stored in the storage section, the specification information updating section may compare the new selection object position information selected by the object selection section with the object position information specified by the specification information stored in the storage section, and, when determining that the new selection object position information is changed from the object position information specified by the specification information, the specification information updating section may transmit information, which indicates that the new selection object position information is changed, to the information input apparatus via the transmission section.

The information processing apparatus may further include a display control section which displays the cursor at a position indicated by the pre-movement position information decided by the cursor position control section, and thereafter moves the cursor to the position indicated by the post-movement position information decided by the cursor position control section.

In calculating the cursor-movement vector by multiplying the operating tool-movement vector received by the reception section by a predetermined coefficient, the cursor position control section may calculate the cursor-movement vector by setting the predetermined coefficient to a smaller value with elapse of time.

In calculating the cursor-movement vector by multiplying the operating tool-movement vector received by the reception section by a predetermined coefficient, the cursor position control section may calculate the cursor-movement vector by setting the predetermined coefficient to a smaller value as the cursor-movement vector becomes large.

According to the embodiment of the present invention described above, it becomes possible for the user to quickly perform specification of the cursor position and to perform minute specification of the cursor position.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Embodiment
1-1. Configuration of information processing system
1-2. Outline of function of information processing system
1-3. Examples of various types of information stored in storage section of information processing apparatus
1-4. Functional configuration of information processing apparatus
1-5. Functional configuration of information input apparatus
1-6. Hardware configuration of information processing apparatus
1-7. Hardware configuration of information input apparatus
1-8. State transition of information processing system
2. Modified example
3. Summary

1. EMBODIMENT

1-1. Configuration of Information Processing System

Figure 1:
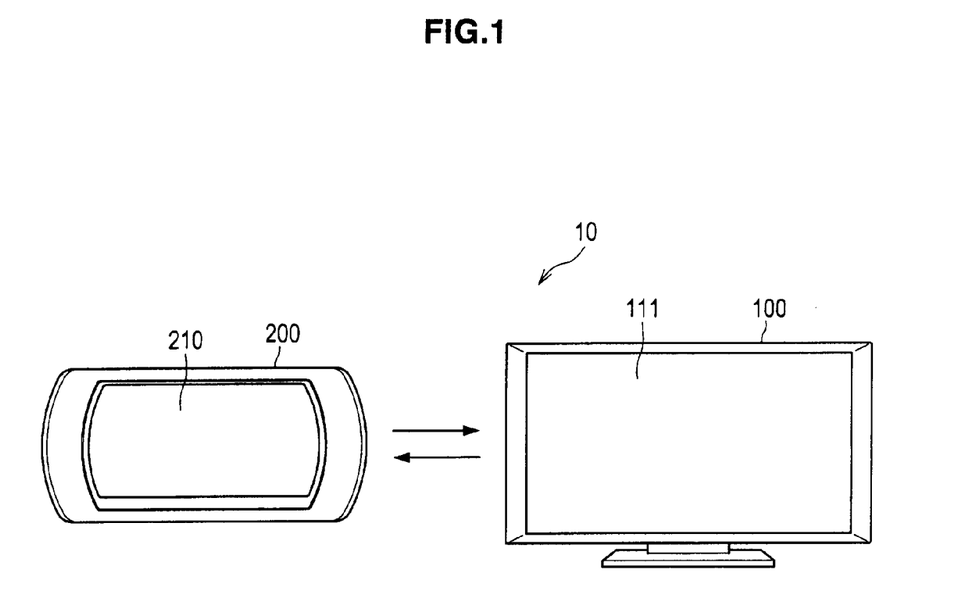
FIG. 1 is a diagram showing a configuration of an information processing system according to an embodiment of the present invention.

FIG. 1 is a diagram showing a configuration of an information processing system according to an embodiment of the present invention. With reference to FIG. 1 (refer to other figures as appropriate), the configuration of the information processing system according to the embodiment will be described.

As shown in FIG. 1, an information processing system 10 according to the embodiment of the present invention includes an information processing apparatus 100 and an information input apparatus 200. The information input apparatus 200 has at least an input section 210 configured from a touch pad and the like, and has functions of accepting input of operating tool-position information indicating a position of an operating tool on the input section 210 and transmitting via wire or radio the operating tool-position information, the input of which is accepted, to the information processing apparatus 100. In addition, the information input apparatus 200 has functions of further accepting input of an operating tool-movement vector on the input section 210 and transmitting via wire or radio the operating tool-movement vector, the input of which is accepted, to the information processing apparatus 100. Therefore, the information input apparatus 200 is not particularly limited as long as it has those functions, and a remote control provided with a touch panel can be used as the information input apparatus 200, for example.

The information processing apparatus 100 has at least a display surface 111, and is provided with a display section which is capable of displaying information on the display surface 111. Further, the information processing apparatus 100 has mapping information for associating a position on the input section 210 which the information input apparatus 200 has with a position on the display surface 111 which the information processing apparatus 100 has at a ratio of 1:1. Then, the information processing apparatus 100 calculates cursor-position information indicating a position of a cursor on the display surface 111 based on the operating tool-position information transmitted via wire or radio from the information input apparatus 200 and the mapping information. The position indicated by the calculated cursor-position information is decided as an initial position of the cursor.

Further, the information processing apparatus 100 calculates a cursor-movement vector on the display surface 111 based on the operating tool-movement vector transmitted via wire or radio from the information input apparatus 200, and moves the cursor in accordance with the calculated cursor-movement vector on the basis of the initial position of the cursor. Such a control enables the information processing apparatus 100 to decide the initial position of the cursor by causing the user to quickly perform specification of the cursor position, and then to move the cursor by causing the user to perform minute specification of the cursor position. The information processing apparatus 100 is not particularly limited as long as it has those functions, and there can be used a PC (Personal Computer) and a TV as the information processing apparatus 100, for example.

1-2. Outline of Function of Information Processing System

Figure 2:
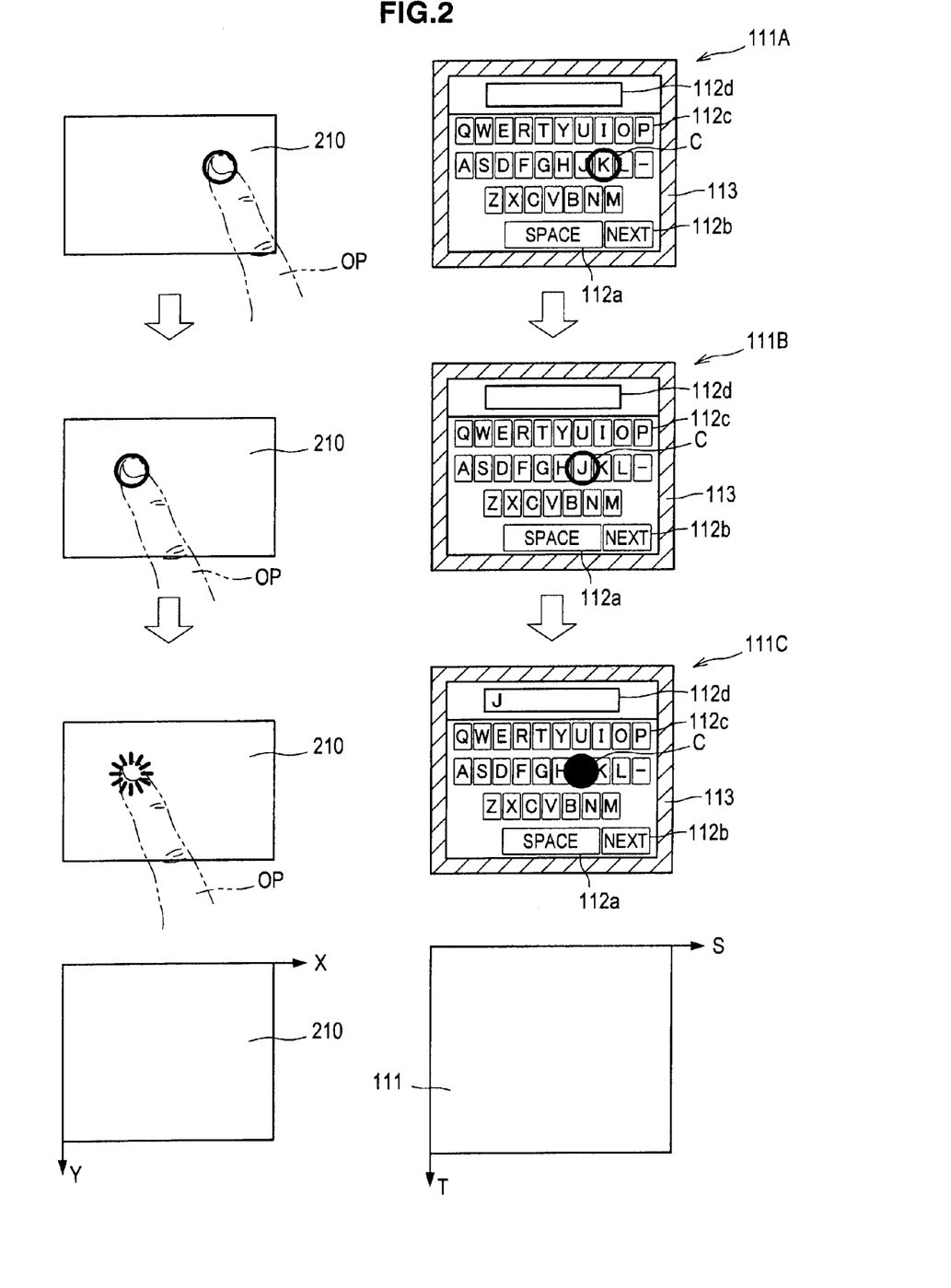
FIG. 2 is a diagram illustrating an outline of a function of the information processing system according to the embodiment.

FIG. 2 is a diagram illustrating an outline of a function of the information processing system according to the embodiment of the present invention. With reference to FIG. 2 (refer to other figures as appropriate), an outline of the function of the information processing system according to the embodiment will be described.

As shown in FIG. 2, there are shown, in chronological order, operation information input to the input section 210 which the information input apparatus 200 has by an operating tool OP, and display examples of screens each displayed by the information processing apparatus 100 which receives the operation information. In the present embodiment, the input section 210 is configured from a touch pad, and position information indicating a position on the input section 210 is represented by X and Y coordinates, for example. Further, position information indicating a position on the display surface 111 is represented by S and T coordinates, for example.

On display surfaces 111A to 111C, there are displayed objects 112*a* to 112*d* and the like as examples of an object, and a cursor C for the user to select one of the objects. In the present embodiment, a form in which the user enters characters from an OSK (On Screen Keyboard) by using a touch pad will be described. In this form, it is necessary that the user continuously select objects, and hence, it is particularly necessary the user quickly perform specification of the cursor position and perform minute specification of the cursor position. However, the form of the information processing system 10 is not limited to such a form.

The object 112*a* is used for entering "SPACE", for example. The object 112*b* is used for entering information for proceeding to the next screen, for example. The object 112*c* is used for entering "P" as an example of the characters. In addition to "P", there are displayed various characters as the objects.

Here, it is assumed that the user wants to enter "J". In that case, the user specifies, by the operating tool OP, a position on the input section 210 that the user thinks is a position corresponding to the position of "J" on the display surface 111A. The information processing apparatus 100 receives operating tool-position information indicating the position specified by the operating tool OP from the information input apparatus 200, and calculates cursor-position information based on the operating tool-position information and mapping information. Accordingly, the information processing apparatus 100 causes the user to quickly perform rough specification of the cursor position. Let us assume that the position indicated by the cursor-position information calculated by the information processing apparatus 100 is in the vicinity of "K". On the display surface 111A, the cursor C is displayed in the vicinity of "K". After that, the user may move the cursor position only a relatively short distance of from "K" to "J".

The user moves the operating tool OP to a position on the input section 210 that the user thinks is a position corresponding to the position of "J" on the display surface 111A. The information processing apparatus 100 receives an operating tool-movement vector indicating the direction and the distance of the movement of the operating tool OP from the information input apparatus 200, and moves the cursor C from the vicinity of "K" in accordance with the operating tool-movement vector. Accordingly, the information processing apparatus 100 causes the user to perform minute specification of the cursor position. On the display surface 111B, the cursor C is displayed in the vicinity of "J". With the cursor C pointing to "J", the user performs operation of selecting an object, to thereby input a processing request to the information input apparatus 200, and the information processing apparatus 100 which receives the processing request from the information input apparatus 200 executes processing of selecting "J" to which the cursor C points. On the display surface 111C, the selected "J" is displayed in the object 112d.

There can be considered various operations as the operation of selecting an object. For example, the information processing system 10 can recognize the operation of the user releasing the operating tool OP from the input section 210 as the operation of selecting an object. Further, for example, in the case where a pressure sensor is provided to the information input apparatus 200, the information processing system 10 can recognize the operation of the user pressing the operating tool OP against the input section 210 at a pressure exceeding a predetermined value as the operation of selecting an object.

A refuge object 113 is necessary mainly in the case where the information processing system 10 adopts the form of recognizing the operation of the user releasing the operating tool OP from the input section 210 as the operation of selecting an object. That is, in this form, since the object at the position corresponding to the position of the cursor C at the point of the user releasing the operating tool OP from the input section 210 is selected, the user may release the operating tool OP from the input section 210 when the cursor C reaches the refuge object 113 in the case where the user does not want to enter anything. Then, in the case of detecting that the operating tool OP is released from the input section 210 when the cursor C reaches the refuge object 113, the information processing apparatus 100 may not execute any processing.

Figure 3:
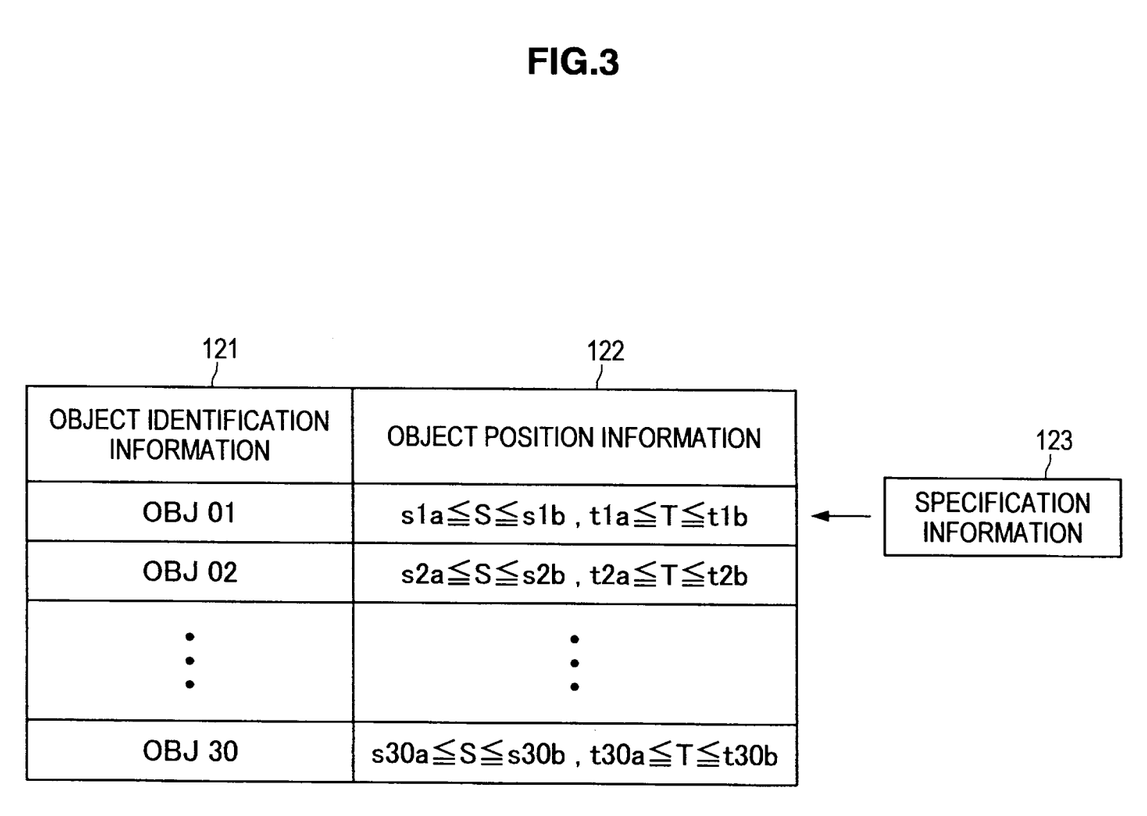
FIG. 3 is a diagram showing examples of various types of information stored in a storage section of an information processing apparatus according to the embodiment.

1-3. Examples of Various Types of Information Stored in Storage Section of Information Processing Apparatus FIG. 3 is a diagram showing examples of various types of information stored in a storage section of an information processing apparatus according to the embodiment of the present invention. With reference to FIG. 3 (refer to other figures as appropriate), various types of information stored in the storage section of the information processing apparatus according to the embodiment will be described.

As shown in FIG. 3, a storage section 120 of the information processing apparatus 100 according to the embodiment of the present invention stores object identification information 121 and object position information 122 in association with each other. In addition thereto, the storage section 120 stores specification information 123.

The object identification information 121 is information for identifying each of pieces of object data used for displaying an object. For example, the object data used for displaying the object 112a is configured from image data for displaying a space bar and the like, and the object data used for displaying the object 112c is configured from image data for displaying a "P" key and the like. The object data is stored in the storage section 120, for example.

The object position information 122 is position information indicating a position at which each of the objects is displayed on the display surface 111. The object position information 122 may be a fixed value or may be a variable value. For example, in the case where an object is pasted in a window displayed on the display surface 111 and a control section 130 moves the window in accordance with operation by the user, the object position information 122 may be changed depending on a movement amount of the window.

The specification information 123 is information for specifying at least one of the pieces of object position information 122. FIG. 3 shows the case where information for specifying "$s1a \leq S \leq s1b, t1a \leq T \leq t1b$" is set as the specification information 123. As the specification information 123, there can be used an address indicating a location in the storage section 120 at which the object position information 122 is stored, for example.

1-4. Functional Configuration of Information Processing Apparatus

Figure 4:
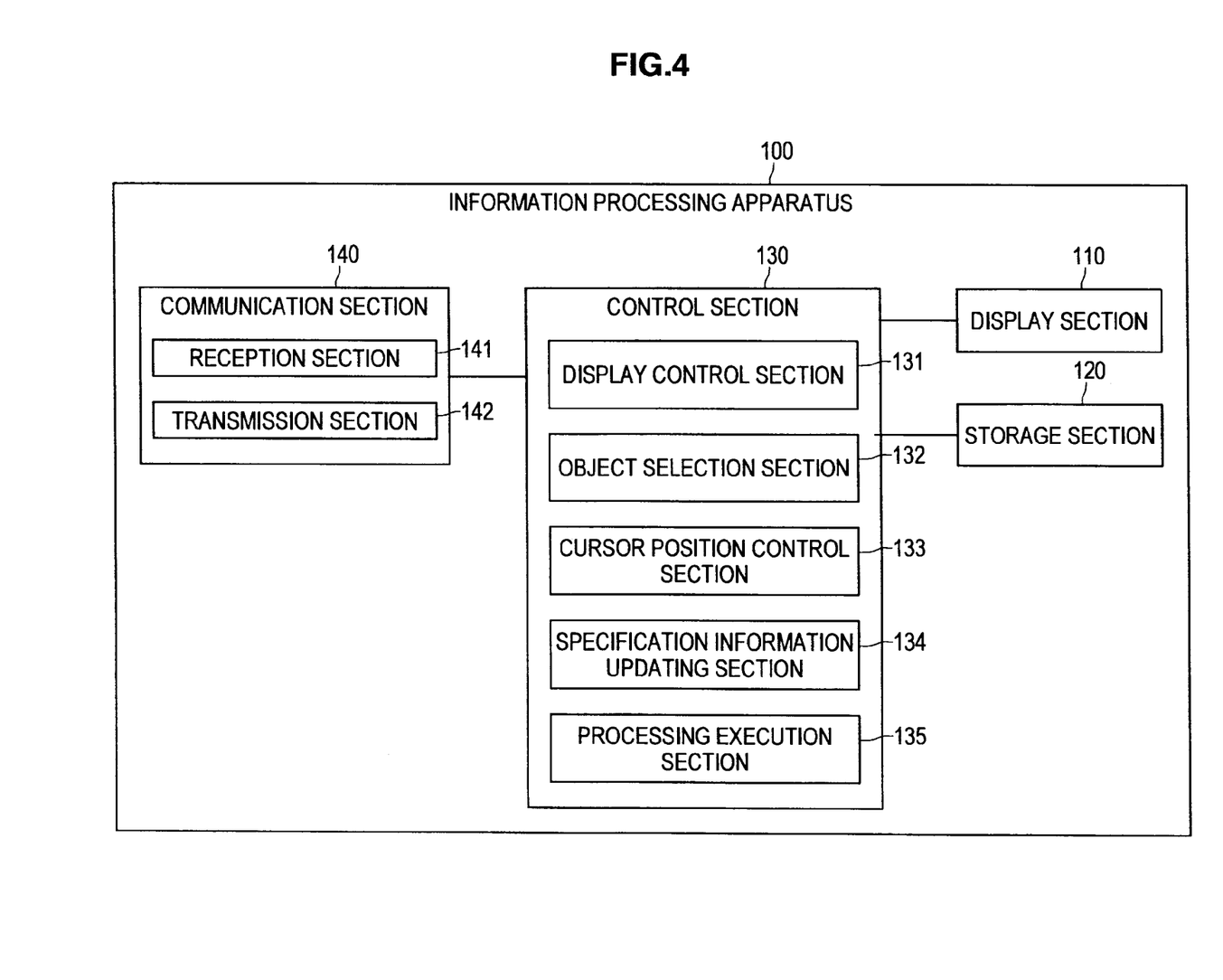
FIG. 4 is a diagram showing a functional configuration of the information processing apparatus according to the embodiment.

FIG. 4 is a diagram showing a functional configuration of the information processing apparatus according to the embodiment of the present invention. With reference to FIG. 4 (refer to other figures as appropriate), the functional configuration of the information processing apparatus according to the embodiment will be described.

As shown in FIG. 4, the information processing apparatus includes a display section 110, a storage section 120, a control section 130, and a communication section 140.

The display section 110 is configured from a display device, for example. The display section 110 has the display surface 111 and is also capable of displaying information on the display surface 111. The information to be displayed on the display surface 111 is output from the control section 130, for example. Further, the display section 110 may be installed outside the information processing apparatus 100.

The storage section 120 is configured from a RAM (Random Access Memory), for example, and has a function of storing a program, data used by the control section 130 when executing a program, and the like. As the data used by the control section 130 when executing a program, there can be used pieces of object position information 122 indicating positions of multiple objects on the display surface 111, and specification information 123 which is the information for specifying at least one of the pieces of object position information 122, for example.

The communication section 140 includes a reception section 141 and the like, and is configured from a communication device, for example. The reception section 141 has a function of receiving, from the information input apparatus 200 which has accepted the input of contact position information indicating a contact position of the operating tool OP on a contact surface provided to the information input apparatus 200, the contact position information. Here, the contact position information is represented by (x0, y0). For example, in the case where the input section 210 provided to the information input apparatus 200 is configured from a touch pad, the contact surface provided to the information input apparatus 200 represents a surface to be a target of position detection on the touch pad. The operation of the user bringing the operating tool OP into contact with the contact surface corresponds to so-called tap operation.

The reception section 141 has a function of further receiving, from the information input apparatus 200 which has accepted the input of an operating tool-movement vector indicating a direction in which and a distance by which the operating tool OP moves on the contact surface from the contact position while being in contact with the contact surface, the operating tool-movement vector. When a current position of the operating tool OP on the contact surface is represented by (x, y), the operating tool-movement vector can be represented by (x−x0, y−y0). The operation of the user moving the operating tool OP on the contact surface while being in contact therewith corresponds to so-called drag operation.

The control section 130 is configured from a CPU (Central Processing Unit), for example, and includes a cursor position control section 133 and the like. The function of the control section 130 is realized by the CPU developing in a RAM a program stored in a non-volatile memory and executing the program developed in the RAM, for example. The control section 130 determines whether or not information for identifying any one of contact position information, an operating tool-movement vector, and a processing request is included in transmission information received by the reception section 141. Then, in the case of determining that the information for identifying one of them is included, the control section 130 acquires the identification information from the transmission information, and performs control corresponding to information identified by the acquired identification information.

The cursor position control section 133 has a function of deciding pre-movement position information indicating a position on the display surface 111 of the cursor C before being moved, based on the contact position information (x0, y0). Here, the pre-movement position information is represented by (s0, t0). In deciding the pre-movement position information, the cursor position control section 133 calculates the pre-movement position information (s0, t0) from the contact position information (x0, y0) based on, for example, mapping information stored in the storage section 120. For example, in the case of using coefficients ($\alpha$, $\beta$) as the mapping information, the cursor position control section 133 can calculates the pre-movement position information (s0, t0) by (x0×$\alpha$, y0×$\beta$).

The cursor position control section 133 has a function of calculating a cursor-movement vector indicating a movement direction and a movement distance of the cursor C on the display surface 111 based on the operating tool-movement vector (x−x0, y−y0) received by the reception section 141. Further, the cursor position control section 133 has a function of deciding post-movement position information indicating a position of the cursor C after being moved on the basis of the decided pre-movement position information (s0, t0) and in accordance with the calculated cursor-movement vector.

The cursor position control section 133 can calculate, for example, a cursor-movement vector by using an operating tool-movement vector (x−x0, y−y0) and a scaling coefficient ($\gamma$, $\eta$), which is found to be ((x−x0)×$\gamma$, (y−y0)×$\eta$). Further, the cursor position control section 133 can calculate the post-movement position information of the cursor C on the basis of the pre-movement position information (s0, t0) and in accordance with the cursor-movement vector ((x−x0)×$\gamma$, (y−y0)×$\eta$), which is found to be (s0+(x−x0)×$\gamma$, t0+(y−y0)×$\eta$).

As described above, the storage section 120 stores multiple pieces of object position information 122 indicating positions of multiple objects on the display surface 111, and may also store specification information 123 which is information for specifying the information corresponding to the pre-movement position information decided by the cursor position control section 133 from among the multiple pieces of object position information 122. In that case, the information processing apparatus 100 may further include an object selection section 132 and a specification information updating section 134.

The object selection section 132 has a function of selecting new selection object position information indicating a position of an object to be newly selected from among the multiple pieces of object position information 122, based on the post-movement position information decided by the cursor position control section 133 and the multiple pieces of object position information 122 stored in the storage section 120. For example, in the case where the post-movement position information decided by the cursor position control section 133 satisfies object position information 122 of "s1a≤S<s1b" and "t1a≤T≤t1b", for example, the object selection section 132 selects this object position information 122 as the new selection object position information.

The specification information updating section 134 has a function of updating the specification information 123 stored in the storage section 120 with the new selection object position information selected by the object selection section 132. That is, the specification information 123 is set to information for specifying the object position information 122 which indicates the position of the object corresponding to the current position of the cursor C.

The information processing apparatus 100 may further include a processing execution section 135. In that case, the reception section 141 further receives, from the information input apparatus 200 which has further accepted the input of a processing request indicating the execution of processing, the processing request. When the processing request is received by the reception section 141, the processing execution section 135 executes the processing corresponding to the specification information 123 stored in the storage section 120. For example, in the case where the specification information 123 is set to information for specifying object position information 122 of "s1a≤S≤s1b" and "t1a≤T≤t1b", the processing execution section 135 acquires "OBJ01" as the object identification information 121 which is stored in the storage section 120 in association with the object position information 122. The processing execution section 135 executes processing corresponding to the object identified by the object identification information 121 "OBJ01". In the case of using a remote control provided with a touch pad as the information input apparatus 200, a processing request can be input to the information input apparatus 200 by operation of the user causing the operating tool OP such as a finger or a pen to touch the touch pad (tap operation).

The processing request received by the reception section 141 is detected by the information input apparatus 200 and then transmitted to the information processing apparatus 100, and there are assumed various techniques for the information input apparatus 200 to detect the processing request. For example, the information input apparatus 200 can determine that the input of the processing request is accepted by detecting that the contact of the operating tool OP with respect to the contact surface is released. The reception section 141 can receive, for example, the processing request transmitted from such an information input apparatus 200.

Further, the information input apparatus 200 can determine that the input of the processing request is accepted by detecting that pressure applied by the operating tool OP against the contact surface exceeds a predetermined value by using a pressure sensor. The reception section 141 can receive, for example, the processing request transmitted from such an information input apparatus 200.

The storage section 120 may store refuge object position information indicating a position of a predetermined refuge object 113 on the display surface 111 as at least one of the multiple pieces of object position information. In executing the processing corresponding to the specification information 123 stored in the storage section 120, the processing execution section 135 may not execute the processing in the case where the specification information 123 is set to the refuge object position information.

Further, the information input apparatus 200 may determine that the input of the processing request is accepted by detecting that a button provided to the information input apparatus 200 is pressed. The reception section 141 can receive the processing request transmitted from such an information input apparatus 200. In such a configuration, if the user releases the operating tool OP without pressing the operating tool OP against the contact surface at pressure exceeding a predetermined value, the user can cause the processing corresponding to the object at the position of the cursor C to be executed by pressing the button.

The information processing apparatus 100 may further include a transmission section 142 which transmits information to the information input apparatus 200. In that case, for example, before updating the specification information 123 stored in the storage section 120, the specification information updating section 134 may compare the new selection object position information selected by the object selection section 132 with the object position information 122 specified by the specification information 123 stored in the storage section 120. Then, in the case of determining that the new selection object position information is changed from the object position information specified by the specification information, the specification information updating section 134 may transmit information, which indicates that the new selection object position information is changed, to the information input apparatus 200 via the transmission section 142.

When receiving the information, which indicates that the object position information is changed, the information input apparatus 200 can output predetermined sound or can vibrate the information input apparatus 200 itself, for example. In this way, the information processing apparatus 100 can notify the user that the cursor C is moved to the next object by appealing to the senses other than the vision.

The information processing apparatus 100 may further include a display control section 131 which displays the cursor C at the position indicated by the pre-movement position information decided by the cursor position control section 133, and thereafter moves the cursor C to the position indicated by the post-movement position information decided by the cursor position control section 133. The cursor C is displayed on the display section 110 by the function that the display control section 131 has. Further, the display control section 131 has a function of displaying the object at the position on the display surface 111 indicated by the object position information 122. As object data used for displaying the object, there is used data identified by the object identification information 121 corresponding to the object position information 122.

There are assumed various techniques of adjusting a scaling coefficient. For example, in calculating the cursor-movement vector by multiplying the operating tool-movement vector received by the reception section 141 by a scaling coefficient, the cursor position control section 133 may calculate the cursor-movement vector by setting the scaling coefficient to a smaller value with the elapse of time. This is based on the consideration that as time elapses, the possibility that it is difficult for the user to minutely adjust the position of the cursor C becomes high.

Further, the cursor position control section 133 may calculate the cursor-movement vector by setting a predetermined coefficient to a smaller value as the cursor-movement vector becomes large. This is based on the consideration that when the user largely moves the cursor C, the possibility that it is difficult for the user to minutely adjust the position of the cursor C becomes high.

1-5. Functional Configuration of Information Input Apparatus

Figure 5:
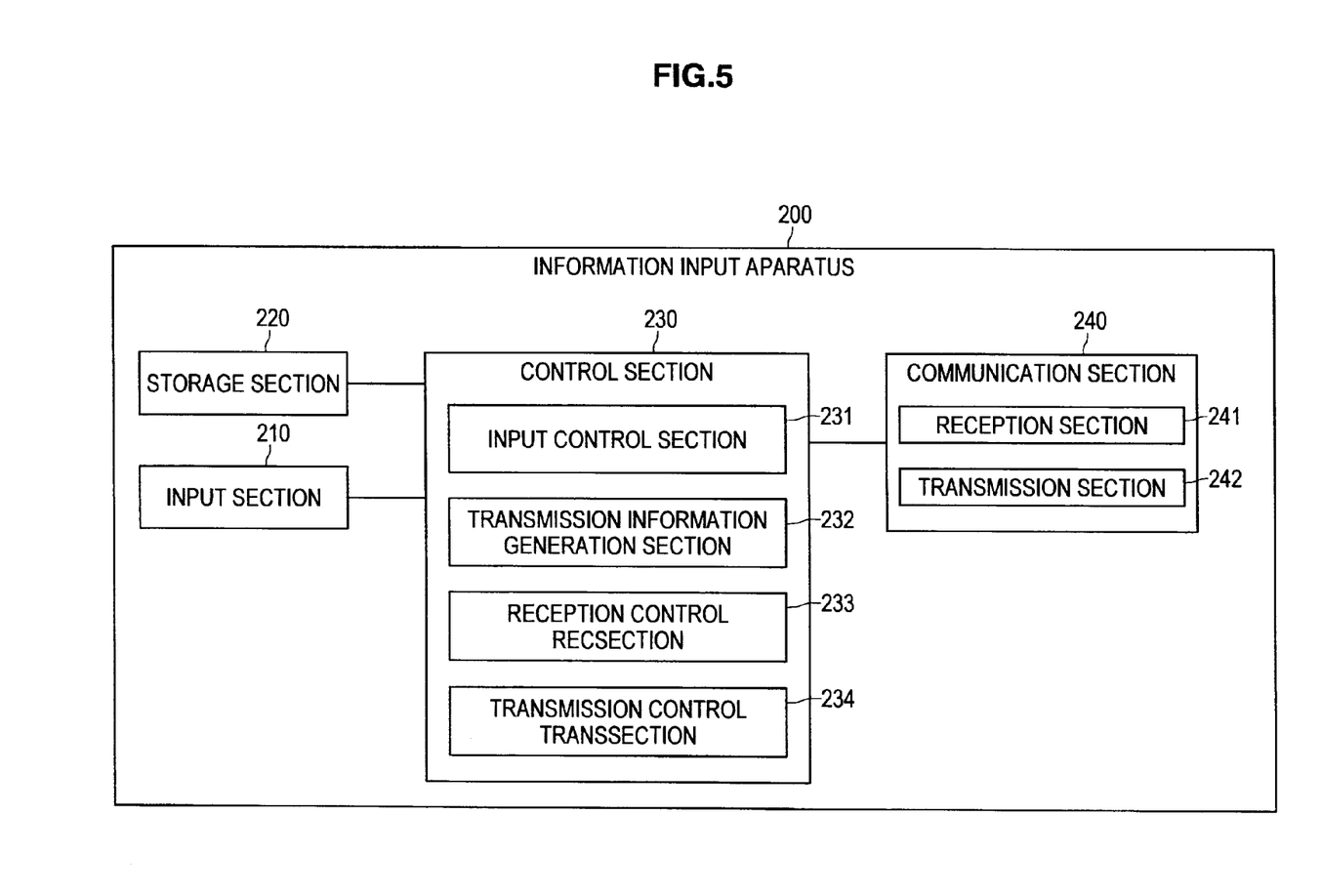
FIG. 5 is a diagram showing a functional configuration of an information input apparatus according to the embodiment.

FIG. 5 is a diagram showing a functional configuration of an information input apparatus according to the embodiment of the present invention. With reference to FIG. 5 (refer to other figures as appropriate), the functional configuration of the information input apparatus according to the embodiment will be described.

As shown in FIG. 5, the information input apparatus 200 includes at least a communication section 240 and an input section 210. Further, the information input apparatus 200 includes a storage section 220, a control section 230, and the like as necessary.

The input section 210 has a function of accepting input of contact position information indicating a contact position of the operating tool OP on the contact surface. Further, the input section 210 has a function of accepting input of an operating tool-movement vector indicating a direction in which and a distance by which the operating tool OP moves on the contact surface from the contact position while being in contact with the contact surface. In addition, the input section 210 may have a function of further accepting input of a processing request indicating execution of processing. As described above, the input section 210 is configured from a touch pad, for example.

The communication section 240 includes a reception section 241, a transmission section 242, and the like, and is configured from a communication device, for example. The reception section 241 has a function of receiving various types of information from the information processing apparatus 100. The transmission section 242 has a function of transmitting various types of information to the information processing apparatus 100, and for example, has a function of transmitting information the input of which is accepted by the input section 210.

The storage section 220 is configured from a RAM, for example, and has a function of storing a program, data used by the control section 230 when executing a program, and the like.

The control section 230 is configured from a CPU, for example, and includes an input control section 231, a transmission information generation section 232, a reception control section 233, and a transmission control section 234. The function of the control section 230 is realized by the CPU developing in a RAM a program stored in a non-volatile memory and executing the program developed in the RAM, for example.

The input control section 231 has a function of acquiring the various types of information the input of which are accepted by the input section 210 from the input section 210. The various types of information acquired by the input control section 231 are output to the transmission information generation section 232, for example.

The transmission information generation section 232 has functions of determining the various types of information acquired by the input control section 231 and generating transmission information to be transmitted to the information processing apparatus 100. For example, in the case of determining that contact position information is included in the information acquired by the input control section 231, the transmission information generation section 232 generates transmission information including the contact position information. For example, in the case of determining that an operating tool-movement vector is included in the information acquired by the input control section 231, the transmission information generation section 232 generates transmission information including the operating tool-movement vector. For example, in the case of determining that a processing request is included in the information acquired by the input control section 231, the transmission information generation section 232 generates transmission information including the processing request.

The reception control section 233 has a function of acquiring the various types of information received by the reception section 241. The various types of information acquired by the reception control section 233 is determined by the control section 230, and control corresponding to the results of the determination is performed by the control section 230.

The transmission control section 234 has a function of transmitting via wire or radio the transmission information generated by the transmission information generation section 232 to the information processing apparatus 100.

1-6. Hardware Configuration of Information Processing Apparatus

Figure 6:
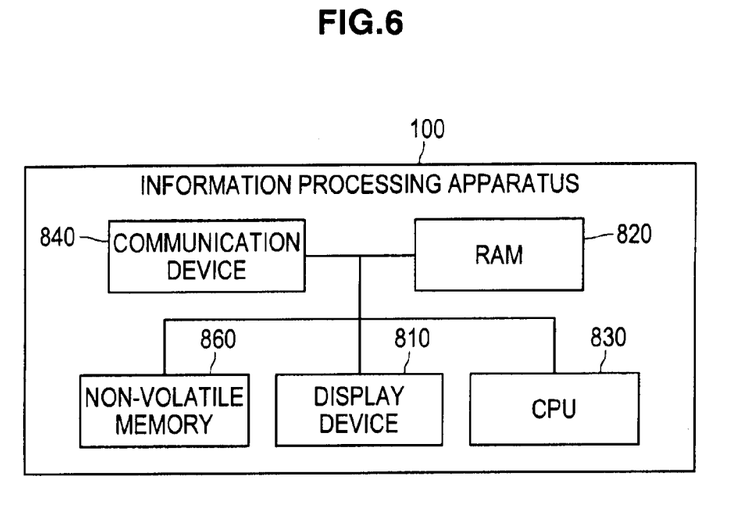
FIG. 6 is a diagram showing a hardware configuration of the information processing apparatus according to the embodiment.

FIG. 6 is a diagram showing a hardware configuration of the information processing apparatus according to the embodiment of the present invention. With reference to FIG. 6 (refer to other figures as appropriate), the hardware configuration of the information processing apparatus according to the embodiment will be described.

As shown in FIG. 6, the information processing apparatus 100 mainly includes, for example, a display device 810, a RAM 820, a CPU 830, a communication device 840, and a non-volatile memory 860. However, the hardware included in the information processing apparatus 100 is not limited thereto. The hardware may be substituted by other hardware, or other hardware may be added thereto as appropriate.

The display device 810 has a display surface 111, and is capable of displaying information on the display surface 111. The display device 810 configured from a device which is capable of visually notifying the user of information, such as an LCD (Liquid Crystal Display) and an organic EL (Electroluminescence) display device. The display device 810 outputs the results obtained from various types of processing performed by the information processing apparatus 100 in text or image form, for example.

The RAM 820 stores a program executed by the CPU 830, data used when the program is executed, and the like.

The CPU 830 functions as an arithmetic processing unit and a control unit, and controls the overall operation inside the information processing apparatus 100 or a portion thereof according to various programs recorded in the RAM 820 or the non-volatile memory 860.

The communication device 840 has a function of communicating with the information input apparatus 200. The communication device 840 is capable of receiving via wire or radio a signal from the information input apparatus 200 and is capable of transmitting via wire or radio a signal to the information input apparatus 200 by an instruction from the CPU 830.

The non-volatile memory 860 is a device for storing data, and is configured from, for example, a magnetic storage device such as an HDD (Hard Disk Drive), a semiconductor storage device, an optical storage device, and a magneto-optical storage device. The non-volatile memory 860 stores programs executed by the CPU 830 and various types of data.

In the foregoing, an example of the hardware configuration which can realize the function of the information processing apparatus 100 according to the embodiment of the present invention has been shown. Each of the above components may be configured using general-purpose members or hardware specialized for the function of each component. Therefore, the hardware configuration to be used can be changed appropriately in accordance with the technical level each time when the embodiment is carried out.

1-7. Hardware Configuration of Information Input Apparatus

Figure 7:
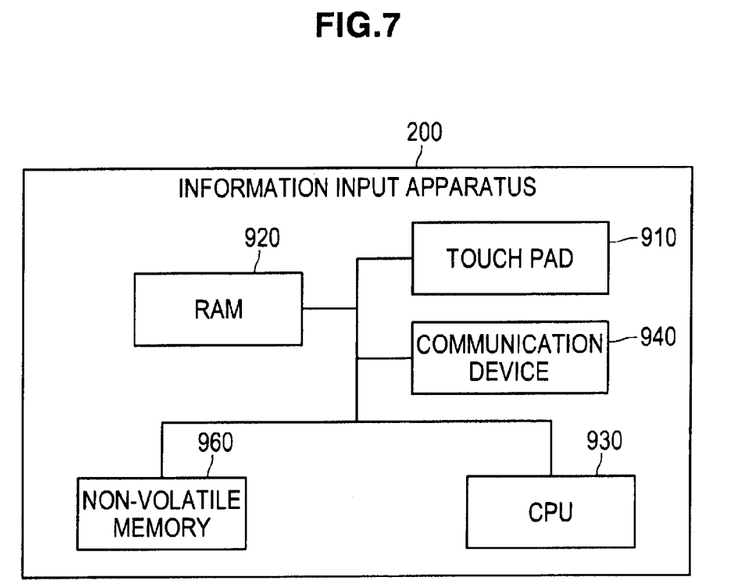
FIG. 7 is a diagram showing a hardware configuration of the information input apparatus according to the embodiment.

FIG. 7 is a diagram showing a hardware configuration of the information input apparatus according to the embodiment of the present invention. With reference to FIG. 7 (refer to other figures as appropriate), the hardware configuration of the information input apparatus according to the embodiment will be described.

As shown in FIG. 7, the information input apparatus 200 mainly includes, for example, a touch pad 910, a RAM 920, a CPU 930, a communication device 940, and a non-volatile memory 960. However, the hardware included in the information input apparatus 200 is not limited thereto. The hardware may be substituted by other hardware, or other hardware may be added thereto as appropriate.

The touch pad 910 has a contact surface, and outputs position information indicating the position on the contact surface which an operating tool OP (user's finger or pen) touches to the CPU 930 as an information signal. By causing the operating tool OP to touch the touch pad 910, the user can input various types of data to the information input apparatus 200 and can instruct the information input apparatus 200 of processing operation. Any device may be used as the touch pad 910, as long as it can detect the position on the contact surface which the operating tool OP touches.

The RAM 920 stores a program executed by the CPU 930, data used when the program is executed, and the like.

The CPU 930 functions as an arithmetic processing unit and a control unit, and controls the overall operation inside the information input apparatus 200 or a portion thereof according to various programs recorded in the RAM 920 or the non-volatile memory 960.

The communication device 940 has a function of communicating with the information processing apparatus 100. The communication device 940 is capable of receiving via wire or radio a signal from the information processing apparatus 100 and is capable of transmitting via wire or radio a signal to the information processing apparatus 100 by an instruction from the CPU 930.

The non-volatile memory 960 is a device for storing data, and is configured from, for example, a magnetic storage device such as an HDD, a semiconductor storage device, an optical storage device, and a magneto-optical storage device. The non-volatile memory 960 stores programs executed by the CPU 930 and various types of data.

In the foregoing, an example of the hardware configuration which can realize the function of the information input apparatus 200 according to the embodiment of the present invention has been shown. Each of the above components may be configured using general-purpose members or hardware specialized for the function of each component. Therefore, the hardware configuration to be used can be changed appropriately in accordance with the technical level each time when the embodiment is carried out.

1-8. State Transition of Information Processing System

Figure 8:
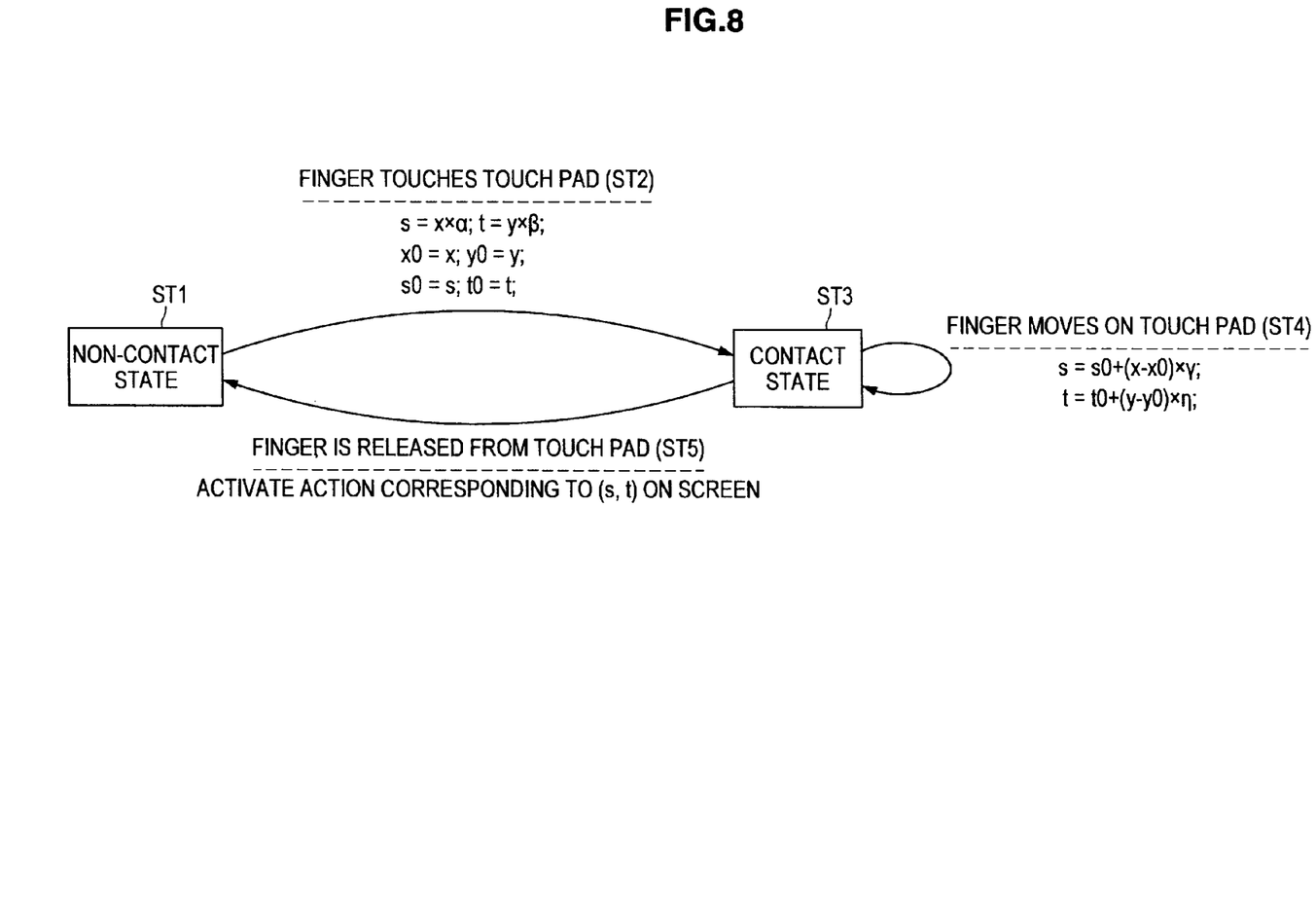
FIG. 8 is a diagram showing a state transition of the information processing system according to the embodiment.

FIG. 8 is a flowchart showing a flow of operation of the information processing apparatus according to the embodiment of the present invention. With reference to FIG. 8 (refer to other figures as appropriate), the flow of operation of the information processing apparatus according to the embodiment will be described. Note that, in FIG. 8, although the meanings of respective symbols are as described above, (x, y) represents a current position of the operating tool OP on the touch pad and (s, t) represents a current position of the cursor C on the display surface 111.

As shown in FIG. 8, it is started from the operating tool OP being in a non-contact state (ST1) with respect to the touch pad, and when a finger as an example of the operating tool OP touches the touch pad (ST2), the information processing apparatus 100 multiplies current position information (x, y) of the finger on the touch pad by a coefficient ($\alpha$, $\beta$), to thereby calculate a current position of the cursor C on the display surface 111, sets the contact position information (x0, y0) to (x, y), and also sets the pre-movement position information (s0, t0) to (s, t).

While keeping the finger in contact with the touch pad (ST3), the finger moves on the touch pad (ST4), and the information processing apparatus 100 sets the current position information (s, t) of the cursor C to (s0+(x−x0)×$\gamma$, t0+(y−y0)×$\eta$). When detecting that the finger is released from the touch pad (ST5), the information processing apparatus 100 activates an action corresponding to (s, t) on the screen and returns to the non-contact state (ST1).

2. MODIFIED EXAMPLE

It should be understood by those skilled in the art that various modifications, combinations, sub-combinations and alterations may occur depending on design requirements and other factors insofar as they are within the scope of the appended claims or the equivalents thereof.

3. SUMMARY

According to the present embodiment, it becomes possible for the user to quickly perform specification of the cursor position and to perform minute specification of the cursor position.

The present application contains subject matter related to that disclosed in Japanese Priority Patent Application JP 2010-032662 filed in the Japan Patent Office on Feb. 17, 2010, the entire content of which is hereby incorporated by reference.

What is claimed is:

1. An information processing apparatus comprising:
a reception section which receives, from an information input apparatus which has accepted input of contact position information indicating a contact position of an operating tool on a contact surface, the contact position information; and
a cursor position control section which decides pre-movement position information indicating a position on a display surface of a cursor before being moved based on the contact position information received by the reception section,
wherein the reception section further receives, from the information input apparatus which has accepted input of an operating tool-movement vector indicating a direction in which and a distance by which the operating tool moves on the contact surface from the contact position while being in contact with the contact surface, the operating tool-movement vector,
wherein the cursor position control section calculates a cursor-movement vector indicating a movement direction and a movement distance of the cursor on the display surface based on the operating tool-movement vector received by the reception section, and decides post-movement position information indicating a position of the cursor after being moved on a basis of the decided pre-movement position information and in accordance with the calculated cursor-movement vector, and
wherein,
prior to the movement from the contact position of the operating tool upon the contact surface, the cursor position control section decides the pre-movement position information of the cursor position on the display surface based on a mapping of each point of the contact surface of the information input apparatus to a respective position of the display surface, and
after the movement from the contact position of the operating tool upon the contact surface, the cursor position control section calculates the cursor-movement vector based on the received operating tool-movement vector and decides the post-movement position information on the basis of the decided pre-movement position information and in accordance with the calculated cursor-movement vector.

2. The information processing apparatus according to claim 1, further comprising:
a storage section which stores a plurality of pieces of object position information indicating positions of a plurality of objects on the display surface, and also stores specification information which is information for specifying information corresponding to the pre-movement position information decided by the cursor position control section from among the plurality of pieces of object position information;
an object selection section which selects new selection object position information indicating a position of an object to be newly selected from among the plurality of pieces of object position information, based on the post-movement position information decided by the cursor position control section and the plurality of pieces of object position information stored in the storage section; and
a specification information updating section which updates the specification information stored in the storage section with the new selection object position information selected by the object selection section.

3. The information processing apparatus according to claim 2, further comprising
a processing execution section,
wherein the reception section further receives, from the information input apparatus which has further accepted input of a processing request indicating execution of processing, the processing request, and
wherein, when the processing request is received by the reception section, the processing execution section executes processing corresponding to the specification information stored in the storage section.

4. The information processing apparatus according to claim 3,
wherein the reception section receives, from the information input apparatus which has determined that the input of the processing request is accepted by detecting that the contact of the operating tool with respect to the contact surface is released, the processing request.

5. The information processing apparatus according to claim 4,
wherein the storage section stores refuge object position information indicating a position of a predetermined refuge object on the display surface as at least one of the plurality of pieces of object position information, and
wherein, in executing the processing corresponding to the specification information stored in the storage section, the processing execution section does not execute the processing when the specification information is set to the refuge object position information.

6. The information processing apparatus according to claim 3,
wherein the reception section receives, from the information input apparatus which has determined that the input of the processing request is accepted by detecting that pressure applied by the operating tool against the contact surface exceeds a predetermined value by using a pressure sensor, the processing request.

7. The information processing apparatus according to claim 6,
wherein the reception section receives, from the information input apparatus which has determined that the input of the processing request is accepted by detecting that a button is pressed, the processing request.

8. The information processing apparatus according to claim 2, further comprising
a transmission section which transmits information to the information input apparatus,
wherein, before updating the specification information stored in the storage section, the specification information updating section compares the new selection object position information selected by the object selection section with the object position information specified by the specification information stored in the storage section, and, when determining that the new selection object position information is changed from the object position information specified by the specification information, the specification information updating section transmits information, which indicates that the new selection object position information is changed, to the information input apparatus via the transmission section.

9. The information processing apparatus according to claim 1, further comprising
a display control section which displays the cursor at a position indicated by the pre-movement position information decided by the cursor position control section, and thereafter moves the cursor to the position indicated by the post-movement position information decided by the cursor position control section.

10. The information processing apparatus according to claim 1,
wherein, in calculating the cursor-movement vector by multiplying the operating tool-movement vector received by the reception section by a predetermined coefficient, the cursor position control section calculates the cursor-movement vector by setting the predetermined coefficient to a smaller value with elapse of time.

11. The information processing apparatus according to claim 1,
wherein, in calculating the cursor-movement vector by multiplying the operating tool-movement vector received by the reception section by a predetermined coefficient, the cursor position control section calculates the cursor-movement vector by setting the predetermined coefficient to a smaller value as the cursor-movement vector becomes large.

12. The information processing apparatus according to claim 1,
wherein the contact surface of the information input apparatus is mapped to the display surface at a ratio of 1:1.

13. An information processing method, comprising the steps of:
receiving, from an information input apparatus which has accepted input of contact position information indicating a contact position of an operating tool on a contact surface, the contact position information;
deciding pre-movement position information indicating a position on a display surface of a cursor before being moved based on the contact position information;
receiving, from the information input apparatus which has accepted input of an operating tool-movement vector indicating a direction in which and a distance by which the operating tool moves on the contact surface from the contact position while being in contact with the contact surface, the operating tool-movement vector;
calculating a cursor-movement vector indicating a movement direction and a movement distance of the cursor on the display surface based on the operating tool-movement vector; and
deciding post-movement position information indicating a position of the cursor after being moved on a basis of the decided pre-movement position information and in accordance with the calculated cursor-movement vector, wherein,
prior to the movement from the contact position of the operating tool upon the contact surface, the pre-movement position information of the cursor position on the display surface is decided based on a mapping of each point of the contact surface of the information input apparatus to a respective position of the display surface, and
after the movement from the contact position of the operating tool upon the contact surface, the cursor-movement vector is calculated based on the received operating tool-movement vector and the post-movement position information is decided on the basis of the decided pre-movement position information and in accordance with the calculated cursor-movement vector.

14. A program for causing a computer to function as an information processing apparatus which includes
a reception section which receives, from an information input apparatus which has accepted input of contact position information indicating a contact position of an operating tool on a contact surface, the contact position information, and
a cursor position control section which decides pre-movement position information indicating a position on a display surface of a cursor before being moved based on the contact position information received by the reception section, wherein the reception section further receives, from the information input apparatus which has accepted input of an operating tool-movement vector indicating a direction in which and a distance by which the operating tool moves on the contact surface from the contact position while being in contact with the contact surface, the operating tool-movement vector, wherein the cursor position control section calculates a cursor-movement vector indicating a movement direction and a movement distance of the cursor on the display surface based on the operating tool-movement vector received by the reception section, and decides post-movement position information indicating a position of the cursor after being moved on the basis of the decided pre-movement position information and in accordance with the calculated cursor-movement vector, and wherein, prior to the movement from the contact position of the operating tool upon the contact surface, the cursor position control section decides the pre-movement position information of the cursor position on the display surface based on a mapping of each point of the contact surface of the information input apparatus to a respective position of the display surface, and after the movement from the contact position of the operating tool upon the contact surface, the cursor position control section calculates the cursor-movement vector based on the received operating tool-movement vector and decides the post-movement position information on the basis of the decided pre-movement position information and in accordance with the calculated cursor-movement vector.

\* \* \* \* \*